US007886980B2

(12) United States Patent
Nishimura et al.

(10) Patent No.: US 7,886,980 B2
(45) Date of Patent: Feb. 15, 2011

(54) PRESENTATION SYSTEM

(75) Inventors: Yoshiaki Nishimura, Tokyo (JP);
Ryuichi Iwamasa, Tokyo (JP);
Nobuhiko Hirayama, Tokyo (JP)

(73) Assignee: Uchida Yoko Co., Ltd., Tokyo (JP)

( * ) Notice: Subject to any disclaimer, the term of this patent is extended or adjusted under 35 U.S.C. 154(b) by 1023 days.

(21) Appl. No.: 11/661,569

(22) PCT Filed: Aug. 31, 2005

(86) PCT No.: PCT/JP2005/015944
§ 371 (c)(1),
(2), (4) Date: Feb. 28, 2007

(87) PCT Pub. No.: WO2006/025468
PCT Pub. Date: Mar. 9, 2006

(65) Prior Publication Data
US 2007/0256017 A1    Nov. 1, 2007

(30) Foreign Application Priority Data
Aug. 31, 2004  (JP)  ............................... 2004-253359

(51) Int. Cl.
*G06K 19/06* (2006.01)
(52) U.S. Cl. .................. 235/492; 235/375; 235/451
(58) Field of Classification Search ................ 235/375, 235/383, 451, 472.01, 486, 492; 340/572.1; 345/156, 848, 850, 852
See application file for complete search history.

(56) References Cited

U.S. PATENT DOCUMENTS

| 5,917,495 | A | * | 6/1999 | Doi et al. ..................... 345/419 |
| 5,929,848 | A | | 7/1999 | Albukerk et al. |
| 6,690,402 | B1 | | 2/2004 | Waller et al. |
| 7,199,725 | B2 | * | 4/2007 | Gilfix et al. ................... 235/375 |
| 2002/0036694 | A1 | * | 3/2002 | Merril ......................... 348/220 |
| 2002/0113778 | A1 | | 8/2002 | Rekimoto et al. |
| 2003/0110216 | A1 | * | 6/2003 | Althin et al. ................. 709/204 |
| 2005/0040994 | A1 | * | 2/2005 | Mazoki et al. ............... 343/809 |

FOREIGN PATENT DOCUMENTS

EP   1 085 432 A2   3/2001

(Continued)

OTHER PUBLICATIONS

International Search Report for PCT Application No. PCT/JP2005/015944; Date of Completion Oct. 21, 2005; Date of Mailing Nov. 8, 2005.

(Continued)

*Primary Examiner*—Thien M. Le
*Assistant Examiner*—Tuyen K. Vo
(74) *Attorney, Agent, or Firm*—Alston & Bird LLP

(57) ABSTRACT

A presentation system can effectively present an exhibit as an exhibition content to a viewer. According to the present invention, in order to perform an effective presentation in a presentation space, an icon 2 that symbolically represents a presentation subject and has identification information thereof stored in a non-contact IC tag, a presentation table 3, a display apparatus 4 and a content display control apparatus 5 are basically provided, and when the icon is placed on the presentation table, the identification information stored in the tag of the icon is read, and the control apparatus 5 displays a content associated with that information on the display apparatus 4.

17 Claims, 15 Drawing Sheets

FOREIGN PATENT DOCUMENTS

| | | |
|---|---|---|
| EP | 1 202 156 A2 | 5/2002 |
| JP | 63-316036 | 12/1988 |
| JP | 09-062651 | 3/1997 |
| JP | 10-263132 | 10/1998 |
| JP | 2003-044614 | 2/2003 |
| JP | 2004-145657 | 5/2004 |

OTHER PUBLICATIONS

Brygg Ullmer, Hiroshi Ishii;*The metaDESK: Models and Prototypes for Tangible User Interfaces*; 10th Annual Symposium of User Interface Software and Technology; Oct. 14-17, 1997; pp. 223-232; Banf, Alberta, Canada.

Dipak Patel; *Habitat: awareness of daily routines and rhythms over a distance using networked furniture*; Proceedings of LCS 2003 London Communication Symposium; Sep. 8-9, 2003; pp. 145-148; London, England.

Jun Rekimoto, Masanori Saitoh;*Augmented Surfaces: A Spatially Continuous Work Space for Hybrid Computing Environments*.

O. Omojola et al., *An Installation of Interactive Furniture*, IBM Systems Journal, vol. 39, No. 3&4, Jun. 2000, pp. 861-879.

Supplementary European Search Report for Appl. No. EP 05 78 1545 completed Aug. 13, 2009.

* cited by examiner screen configuration system configuration

PRESENTATION SYSTEM

TECHNICAL FIELD

The present invention relates to a presentation system for effectively presenting exhibits in a museum, a gallery, a corporate museum or the like.

BACKGROUND ART

In some museums and galleries, to present exhibits, a virtual museum is constructed using a guide system or a computer system to present exhibits in a virtual space, to thereby aid in viewing actual exhibits.

As such a system, there is a virtual museum system (Patent Document 1: Japanese Patent Application Laid-Open No. 2004-145657) that can effectively enhance values of tourism resources of a place by presenting a virtual world superimposed on the real world to visitors, thereby enabling the visitors of that place to access it and to see a scene of that place in a past time.

This virtual museum system presents a virtual space generated by a museum program that controls an object output system having an object output terminal that outputs an object represented by information including at least an object position and output information based on that output information, position measuring means for obtaining the terminal position of said object output terminal and output means for outputting, when said terminal position and said object position is in a predetermined relationship, said object through said object output terminal. The virtual museum system has virtual space management means that defines correspondence between a virtual space in which said object is disposed and an actual space in which said virtual museum is actually developed. The virtual museum system can determine position information in such a way as to display an object of the virtual museum existing in the virtual space at a position in the corresponding actual space.

There has also been disclosed (Patent Document 2: Japanese Patent Application Laid-Open No. 9-62651) an electronic museum service apparatus that frees the user from efforts of selecting each content of a museum for display by himself/herself and selects and displays a series of museum contents that are suitable for an aim of learning automatically without user's own selection of museum contents in the museum in order to efficiently select and display a series of contents suitable for the aim of learning such as "to understand haniwas (clay figures) in the Japanese Kofun period (tumulus period)".

This electronic museum service apparatus supplies computerized multimedia information including graphics, sound and text and includes museum content storing means for storing museum content information in the form of said multimedia information as educational material elements, museum using educational material storing means for storing educational materials each composed of a combination of said educational material elements and museum using educational material search means for searching said educational materials for a desired educational material. The museum using educational material storing means includes learning aim storing means for storing an aim of learning that utilizes said museum content information, educational material element storing means for storing said educational material elements in association with said aim of learning, learner's understanding state storing means for storing information on achievement in learning represented by assessment data for said aim of learning and teaching strategy function means for determining the educational material element to be presented next.

An exhibition in a museum or a gallery as described above is a kind of presentation, and it is necessary to enhance effects of the exhibition.

From this view point, it is possible in the systems disclosed in the above mentioned patent documents 1 and 2 to enhance presentation effects by enhancing exhibition effects through superimposition of a virtual space on exhibits or by automatically supplying data associated with the aim of learning. However, such presentation of an exhibition content is performed by a computer in accordance merely with a specific procedure, and therefore a viewer can foresee the content of the presented data to some extent. Accordingly, from the viewpoint of presentation effects of that exhibit, the viewer has some understanding associated with the foresight, and no surprise exceeding it will occur.

The present invention has been made in view of the above described situations, and has as an object to provide a presentation system that can effectively present exhibits as exhibition contents to viewers.

DISCLOSURE OF THE INVENTION

To achieve the above object, the present invention uses the following means.

According to the present invention, in order to perform an effective presentation in a presentation space, a designation member (which is referred to herein as "icon") that symbolically represents a presentation subject, a presentation table, a display apparatus and a content display control apparatus are basically provided, and when the icon is placed on the presentation table, identification information stored in the icon is read, and the control means displays a content associated with that information on the display apparatus.

To the "icon" is attached a non-contact IC tag. The non-contact IC tag is a device that is used to implement the RFID (radio frequency identification). The RFID is an automatic identification technique that enables data exchange through wireless communication and implemented by a reader/writer (antenna+controller) and an ID tag that can store information in an electronic circuit.

This ID tag is called "data carrier" or "non-contact IC chip", and sometimes referred to collectively as "RFID card". The most common RFID is Suica (registered trademark) that can be used in ticket examination machines of East Japan Railway Company. Since the RFID utilizes a wireless system, communication can be achieved only by holding a card over a reader/writer.

Identification information (referred to as ID) associated with a presentation subject is stored in the non-contact IC tag in advance.

In the presentation table is provided an antenna used to read the ID stored in the tag, and recognition of the ID is made possible only by placing the icon on the table. In this way, a tangible (i.e. capable of being touched or material) operation interface can be constructed. To enable tangible operation, the "icon" on which the non-contact IC tag is attached may be constructed as, for example, a transparent acrylic block having a suitable size to be held by hand, and a miniature model or a photograph representing an exhibit as the presentation subject may be encapsulated therein so that information concerning that exhibit can be grasped intuitively. Alternatively, needless to say, the icon may be constructed as a plate-like card, and a representational picture or a photograph representing an exhibit may be printed or attached on its surface.

It is preferred that the antenna provided in the presentation table be disposed on the backside surface of a table plate serving as the tabletop at least along its outer circumferential edge. The antenna may be provided all along the circumference or along a portion of the circumference.

Although it is sufficient that the display apparatus is disposed in a presentation space, it is preferred, in order to perform presentation effectively, that the display apparatus be housed in the presentation table. When this is the case, the table plate that constitutes the top plate of the table should be made of a translucent material so that it also functions as a display screen for presentation. It is preferred the outer appearance of the table plate that displays contents be finished in uniform black to hide the presence of the antenna and the display apparatus so that the presence of the devices is not be noticed and that a content can be displayed by placing the "icon" at any position in the outer peripheral portion on the table.

The content display control apparatus is provided with a database in which information concerning presentation subjects is stored in association with IDs. When an ID is obtained from an icon, content information associated with that ID is read out from the database and displayed on the display apparatus.

Referring to the control program, a non-contact IC tag recognition program is designed to have an anti-collision function so that when a plurality of "icons" are placed simultaneously, their identification information can be recognized simultaneously. In addition, the system may be designed in such a way that when a plurality of icons are placed, the information of the newest "icon" (the "icon" that was placed last) is always displayed on the display apparatus. Thus, smooth use without interruption of presentation is made possible. Furthermore, by adding effects such as animation or delay in displaying a content or turning pages and adding operation sound in synchronization with display effects, characteristic expressiveness of its own that is different from conventional content displays that utilize a computer is made possible. To generate operation sound etc. an audio apparatus is provided, needless to say. When an audio apparatus is provided, it is also possible to reproduce sound data for explaining the presentation subject.

More specifically, the present invention is provided with the following features.

That is, the system is provided with:

a designation member having a non-contact IC tag holding identification information of a presentation subject and a display representing the presentation subject;

a database in which information about the presentation subject associated with the identification information held in the designation member is stored in advance;

a presentation table having a table plate on which said designation member can be placed and non-contact IC tag data reading means that reads, when the designation member is placed on the table plate, the identification information of the presentation subject from the non-contact IC tag of the designation member in a state of not contacting with the non-contact IC tag; and a content display control apparatus that reads out information about the presentation subject associated with the identification information read by the non-contact IC tag data reading means from the database and displays it on a display apparatus.

Here, at least a part of said table plate may be made of a translucent material such as a glass or a transparent resin, and the display screen of said display apparatus may be disposed on the backside surface of the table plate. As the display apparatus, a projector type display apparatus may be used as well as a CRT, a plasma display apparatus and a liquid crystal display apparatus. It is preferred to use a projector type display apparatus to make the display surface black so as to make the presence of devices unnoticed while projection is not performed.

In connection with this, instead of using a transparent table, a screen may be formed on the table plate and a projection apparatus (such as a projector) for projecting an image on the screen may be disposed above the table. In this case, it is preferred that the projection apparatus be concealed in the ceiling cavity so that viewers are not conscious of the presence of it.

The designation member may be, for example, a cubic object made of a translucent resin in which a display article representing the presentation subject (the article being, for example, at least one of a model, specimen, a real thing and a photograph, of the presentation subject) is encapsulated with a non-contact IC tag attached to the bottom surface of the cubic object.

Said non-contact IC tag data reading means may have an antenna for reading the identification information of the presentation subject provided on a backside surface of said table plate along the outer peripheral edge of said table plate.

It is desired that a panel that displays a plurality of presentation subjects be provided in a presentation space. They are arranged for display on the panel in accordance with a specific order. The specific order is, for example, a chronological order, a systematic order, an operation order or a processing order. It is preferred that an exhibiting portion (such as a storage recess or a seat base) for said designation member (icon) be provided in the vicinity of the display portion.

The contents may be stored in a content server provided in a network via the Internet or a local area network as well as in the database. The content display control apparatus reads out information about the presentation subject associated with the identification information read by the non-contact IC tag data reading means from the content server and displays it on the display apparatus.

It is also advantageous to display as a content not only image information and text information but also sound information. To this end, a sound reproducing apparatus is provided, sound information about the presentation subject associated with the identification information held by the designation member is stored in said database in advance. Said sound reproducing apparatus reads out the sound information about the presentation subject associated with the identification information read by the non-contact IC tag data reading means from the database and reproduces it by a speaker.

Said presentation table may be a counter table for face-to-face sales of articles for sale. Face-to-face sales with customers is performed at this counter table, and said designation member used therein has a display representing an article for sale as the presentation subject. When the designation member having a display representing the article for sale is placed on the counter table, it is detected, and the content data associated with the article for sale is read out. Thus, explanation of the article for sale or the like is performed.

In the case of a museum or a gallery or the like, a plurality of said presentation tables may be prepared. The presentation tables may be placed in different places. On the other hand, a plurality of said designation members may be prepared, and contents associated with the respective designation members may be stored in a content server.

A user picks up one of the designation members and visits presentation tables placed in a plurality of places. Thus, contents associated with the designation member are displayed sequentially on the respective presentation tables in the visiting order.

Said plurality of designation members have ID information that makes it possible to distinguish the designation members from one another. A usage history registry portion that records information that specifies at least a presentation table at which said designation member has been used is provided in some portion in the system. The usage history registry portion is provided for example in the content server, or alternatively it may be provided in some computer provided in the network. The user chooses or picks up a designation member for example at the entrance of the museum, and uses it thereafter upon usage.

In the next presentation table at which the user uses the designation member, the content display control apparatus may read out past usage history information from the aforementioned usage history registry portion and change the content to be displayed on the display depending on the past usage history.

There may also be provided user information registry means for specifying the user of the designation member and storing user information, and the user information registry means may be provided with point awarding means that deposits a point for each user every time the user visits said plurality of presentation tables.

Many facilities such as a museum as mentioned above in which the presentation table according to the present invention is to be placed issue user cards for facility users, and an ID number or the like for specifying the user for management is allotted to each user card. Which presentation tables the user has visited is recorded under a management item according to such a control ID number. It is possible to analyze which exhibit interested the visitor and what degree of interest the user had, by recording not only which presentation table he/she has visited but also which content was displayed when the visitor moved between tables and which content he/she has seen etc. together with time information. In other words, as user information, at least one of information specifying a presentation table visited in the past, information specifying a content viewed in the past, the date and time of visitation at the presentation table and the date and time of viewing of the content is recorded together with information specifying the user.

There may also be provided an exhibition changing apparatus that performs a control to change at least one of exhibition equipments and exhibits disposed in the surrounding of the presentation table upon detection of said designation member as a trigger. The display changing apparatus is adapted to move, for example, a display panel or a shelf, or it may move a model of a dinosaur displayed as an actual exhibit. Thus, an exhibition equipment disposed in the surrounding moves with an operation of the designation member, and the viewer will not be able to hide his/her surprise.

According to the present invention, the content of a presentation subject illustrated on an display panel or the like can be grasped intuitively from an "icon". When an "icon" having such a form is taken by an operator and placed on a presentation table, information stored in the tag is read. This acts as a switch to display a content (such as a still image, moving image or animation) on a display, whereby the viewer will have an illusion as if seeing a magic trick and pay attention to it with surprise.

If the presentation subject is displayed on the display panel and used together with an individual presentation activated by the icon, enhanced presentation effects can be achieved, since the viewer can grasp an overview of the entire information (from the display panel) and details of a part (from the content).

If the display apparatus and other components are housed in the presentation table with such a design and operation interface that make the viewer unconscious of the presence of devices such as a computer and a projector, the viewer of the presentation will be surprised and impressed more greatly. Thus, it is possible to produce an atmosphere that can create a mental state ready for receiving information.

By making use of these characteristic features, it can be advantageously used as a presentation apparatus that provides astonishing expression that enables the viewers to grasp part and whole intuitively in a museum, showroom, shop, exhibition space or in a scene of education or research and development.

Furthermore, since such presentation of information can attract people's interest and attention, it can be utilized not only in communicating information at a presentation but also in promoting sales at a shop.

BEST MODE FOR CARRYING OUT THE INVENTION

First Embodiment

In the following, a description will be made of a case in which the present invention is applied to a corporate museum.

Figure 1:
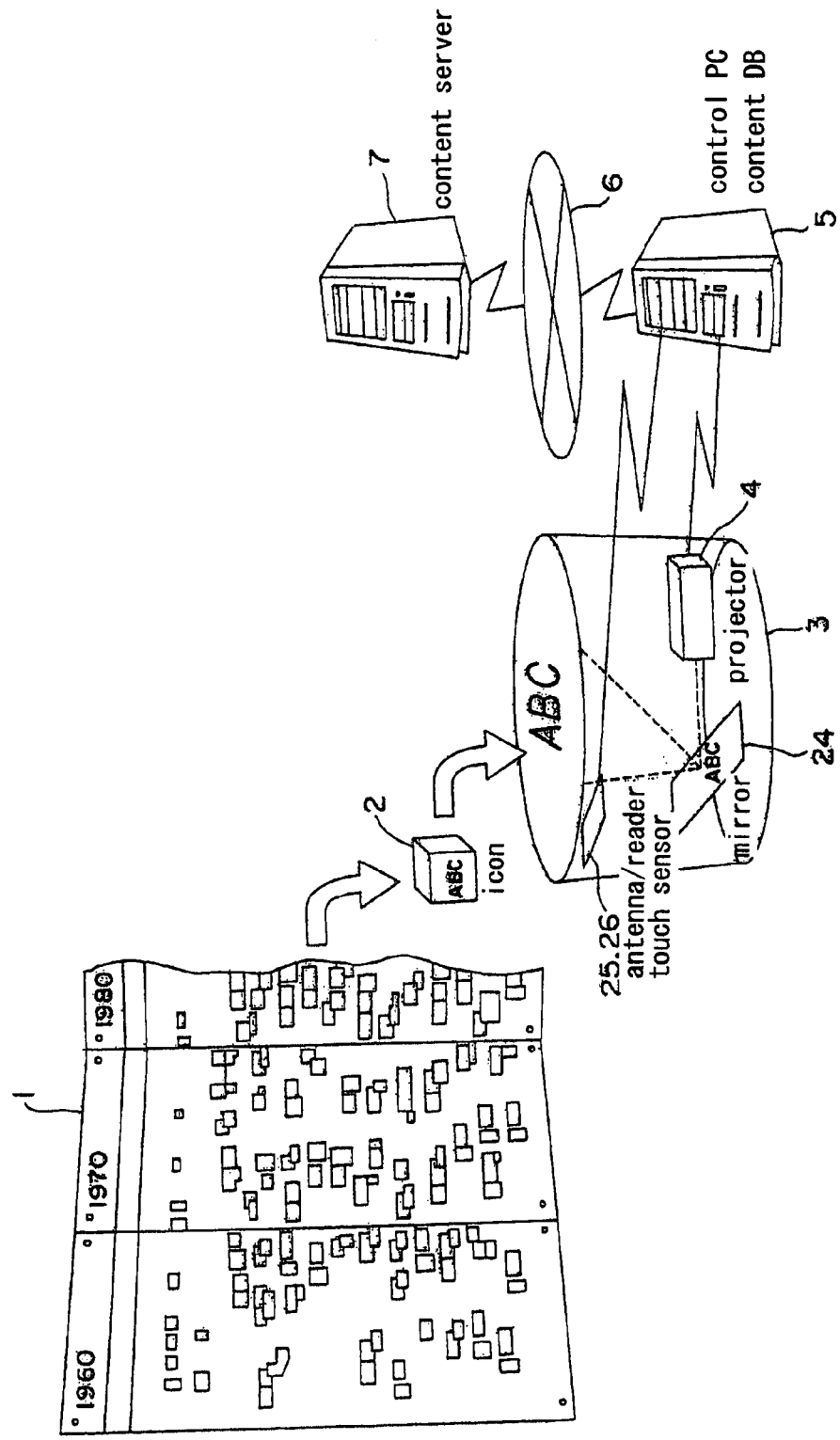
FIG. 1 is a basic configuration diagram showing an example of the present invention.

FIG. 1 is an entire view of an exhibition room provided with an display panel 1 and a presentation table 3. As shown in FIG. 1, the corporate museum has the display panel 1 on a wall of the exhibition space. On the display panel 1 are disposed "icons 2" that symbolically represent exhibits as presentation subjects in such a way that they can be taken out.

The presentation table 3 is placed in the central portion of the exhibition space. The presentation table 3 houses a projector 4 serving as a display apparatus. In addition, a personal computer 5 for controlling is also housed in the table. The personal computer 5 is equipped with a database in the form of a storage device that stores contents of presentation subjects as still images, moving images, animations, texts and sounds etc.

Furthermore, the aforementioned personal computer 5 for controlling is connected with a content server 7 through the Internet 6. The content server 7 stores contents concerning the presentation subjects to supplement the aforementioned database.

Figure 2:
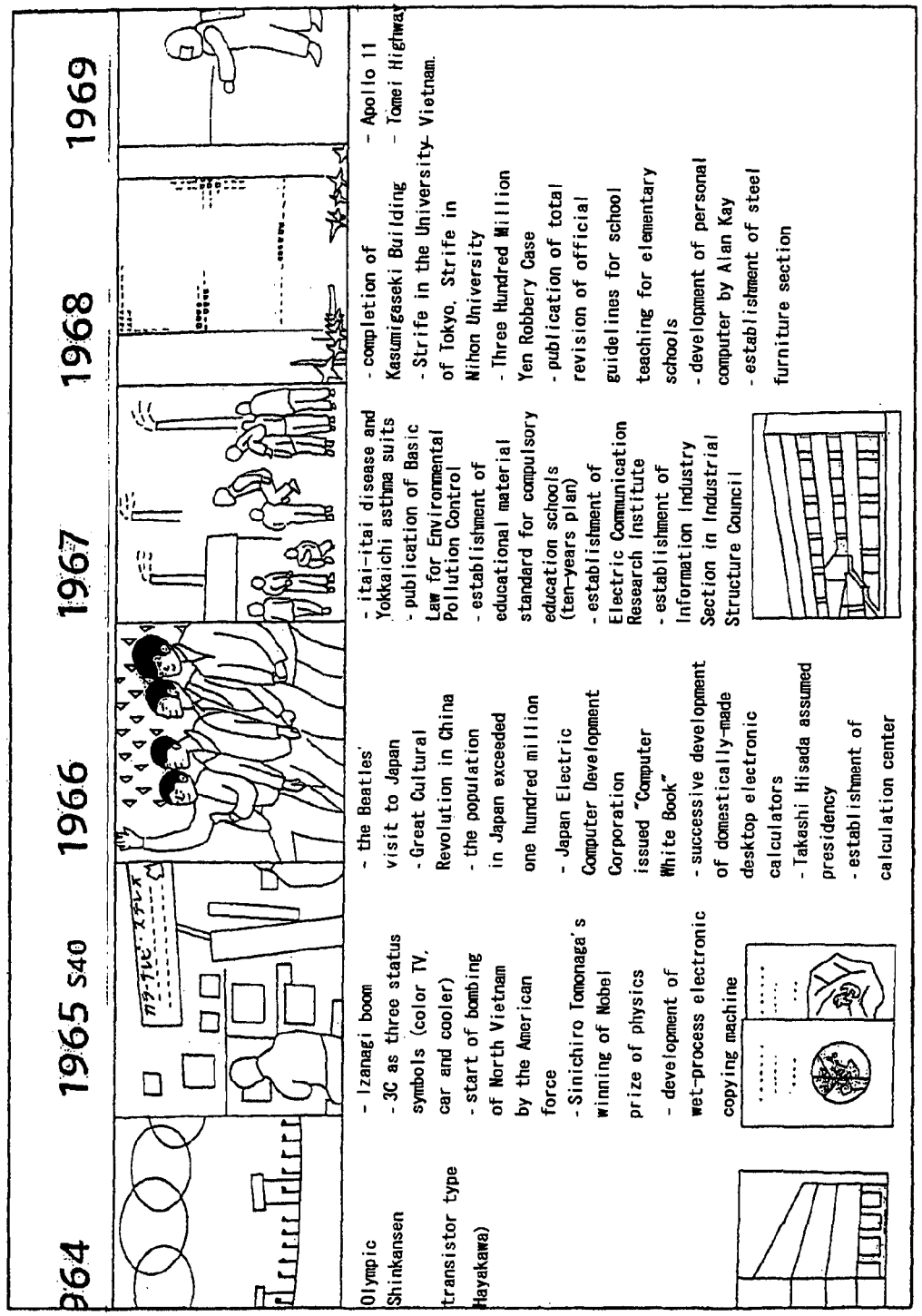
FIG. 2 is an enlarged view of an display panel.

FIG. 2 shows the display panel 1, on which events in the society and events in the corporate in each year are displayed by pictures and titles in chronological order in the form of a chronological table. In FIG. 2, for example, social events such as "Izanagi boom", beginning of bombing of North Vietnam by the American force and winning of Nobel prize of physics by Shinichiro Tomonaga are displayed in the section of 1965. In addition, the development of a wet-process electronic copying machine developed by that corporation is displayed with pictures associated therewith.

It is preferred that the panel position be selected so that the visitors see the display panel 1 first upon stepping into the exhibition space through the entrance to the display space, and an effect or space design to illuminate the display panel 1 with a spotlight be used.

The display panel 1 is a sheet made of a semi-transparent acrylic plate on which a diagram (such as a chronological table, a map, a topographic map or chart) that enables viewers to grasp overall perspective of the subject exhibits is printed, and a backlight system in which an illumination apparatus is provided in the back of the panel 1 or a front lighting system may be selectively used therewith depending on the situation of the exhibition space.

A storage recess 10 is provided in the vicinity of a specific article or title on the display panel 1, and an icon 2 having a cubical shape is stored therein in such a way that it can be taken out and put back into the storage recess 10 freely. In connection with this, a horizontal seat plate extending horizontally from the panel surface may be provided instead of the storage recess 10, and the icon 2 may be placed thereon.

Figure 3:
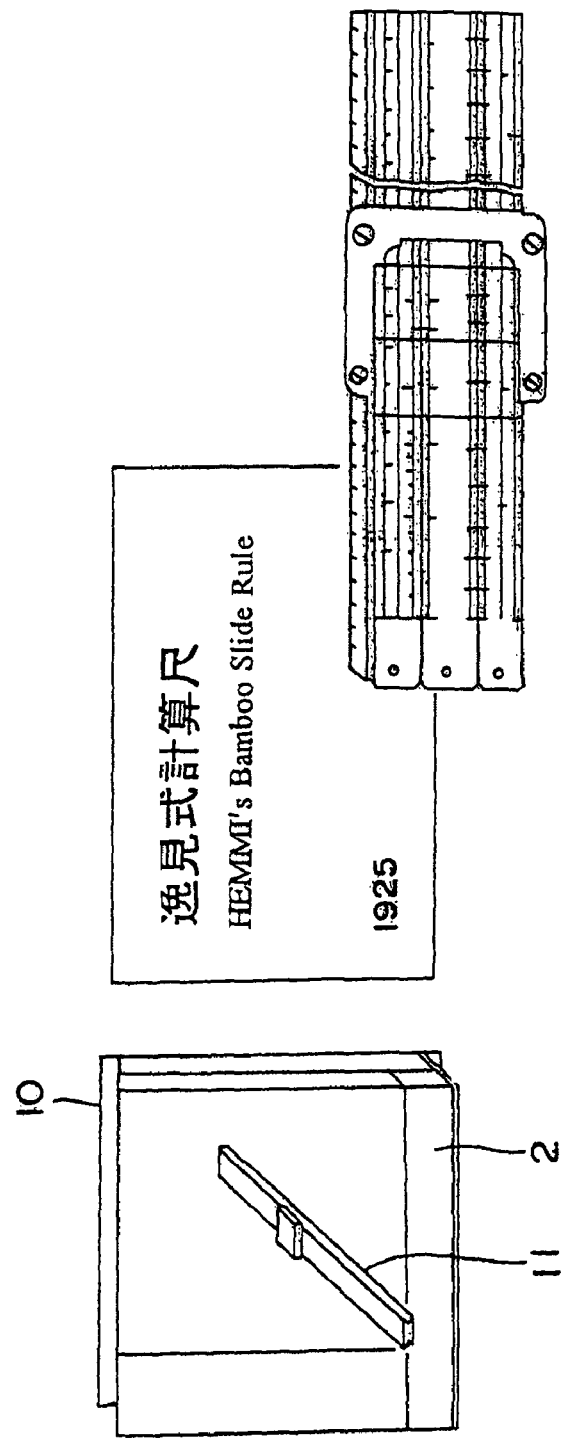
FIG. 3 is illustrates a portion of the display panel that displays a Hemmi's slide rule.

FIG. 3 shows a figure illustrating a Hemmi's slide rule that was developed in 1925 and a storage recess 10 provided in the vicinity thereof. In this storage recess 10 is stored an cubical icon 2 (designation member) made of a transparent acrylic resin in which a miniature model 11 of the Hemmi's slide rule is encapsulated.

The icon 2 is a cube with a side length of 45 to 50 mm, and an RFID tag (tag-it HF-I (registered trade mark) manufactured by Texas Instruments), which is a non-contact IC tag, is attached to its bottom surface. The tag is held between two felt sheets, which are attached on the bottom surface of the icon 2.

The RFID has a CMOS chip including an IC memory and a communication circuit and a micro-miniature antenna built in a flexible substrate made of polyethylene terephthalate, but an electric power source is not built in it. The micro-miniature antenna has a coiled antenna pattern made of an aluminum wire or the like. When writing or reading is performed by a corresponding reader/writer, a power source is induced in the micro-miniature antenna of the RFID wirelessly. The resonance frequency of the radio wave sent to the non-contact IC tag from antennas 25 is 13.56 MHz, in this case. In the IC memory are stored an UID (unique identification) that is unchangeable and unique to each RFID and identification information (ID, which will also be referred to as IC tag data in the following examples) that specifies a presentation subject.

Figure 4:
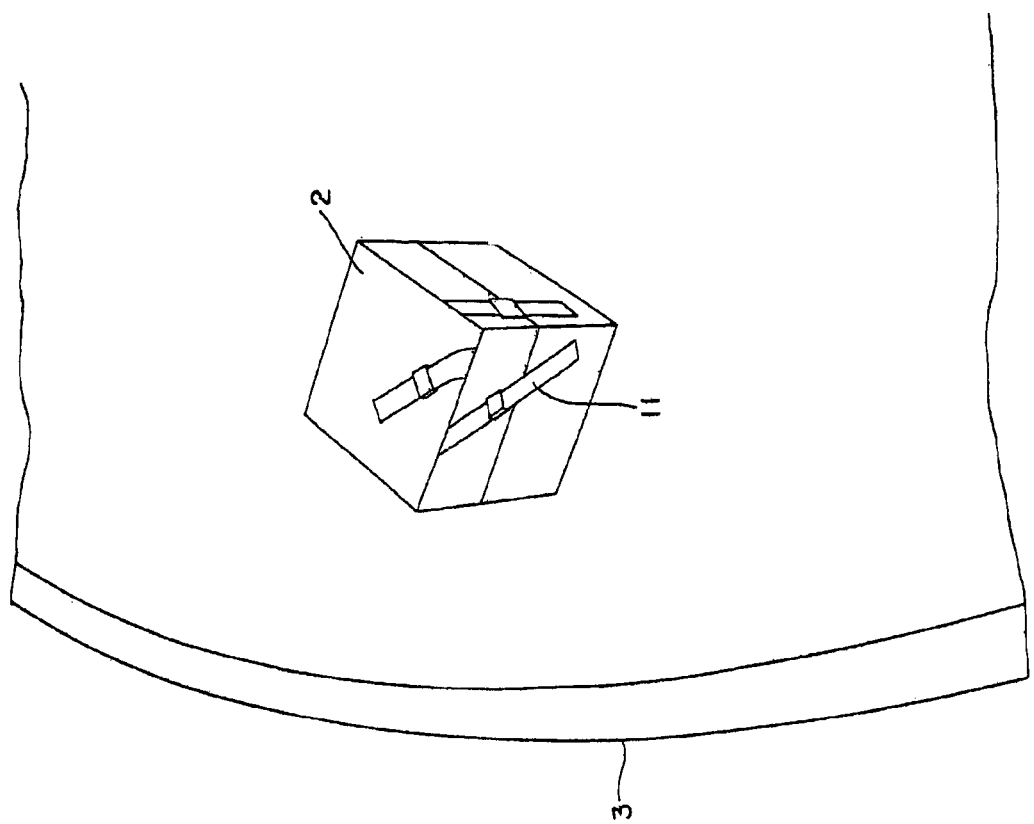
FIG. 4 illustrates an icon (designation member) on a table.

An operator or an interpreter of an exhibit may take out the icon 2 that serves as a designation member from the recess 10 on the panel 1 by hand, as shown in FIG. 4, and place it on the table while explaining the exhibit to a viewer(s).

Figure 5:
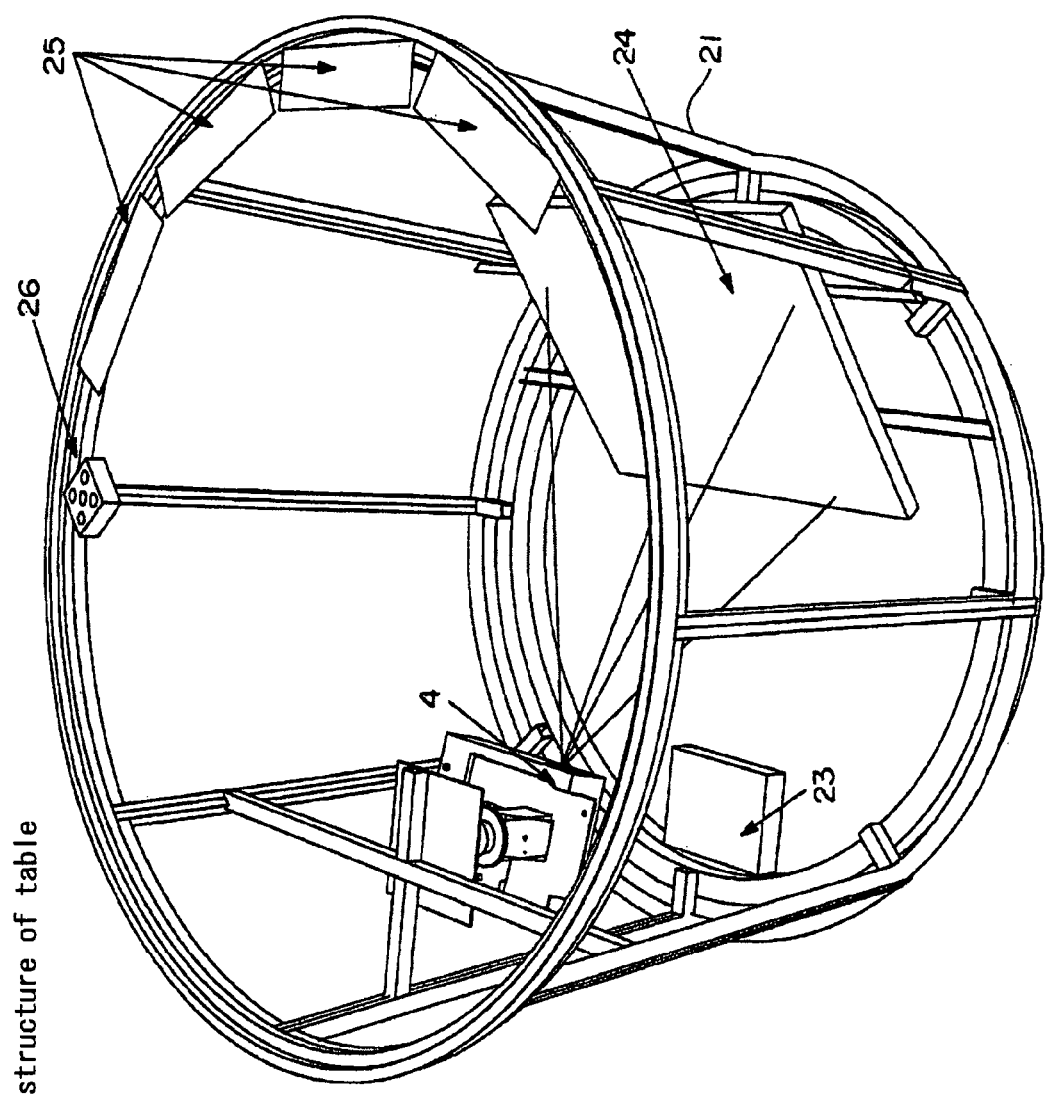
FIG. 5 is a perspective view of a table frame.

As shown in FIG. 5, the presentation table 3 has a substantially drum-shaped frame 21 that supports a round table plate, and the frame 21 is circumferentially covered with a wall. A projector 4, an RFID reader 23 and a mirror member 24 for reflecting light projected from the projector 4 are provided inside the frame 21. RFID antennas 25 connected with the RFID reader 23 are arranged on the bottom surface of the table plate along a portion of the circumference of the round table plate. A touch keyboard 26 is also provided on the surface of table.

Figure 6:
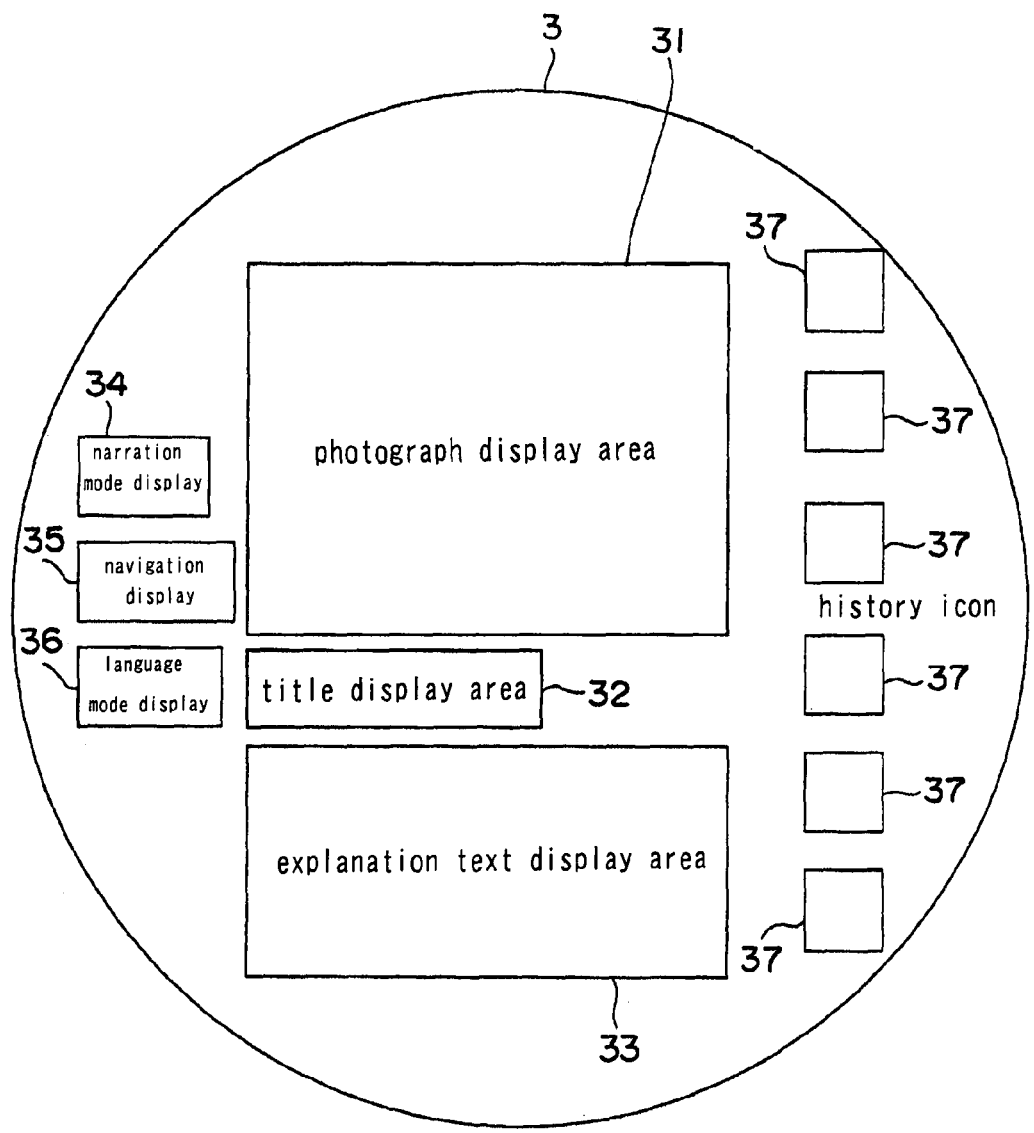
FIG. 6 shows a configuration of screens formed on the surface of a table plate.

The aforementioned table plate is made of a translucent glass plate. A translucent screen on which an image is to be formed upon reception of light reflected from the mirror member 24 that receives light projected by the projector 4 is attached on at least a portion of the backside surface of the glass plate. As shown in FIG. 6, information is displayed on the screen in a separated manner in a photograph display area 31 in which a photograph(s) (graphics) of the presentation subject is displayed, a title display area 32 in which the title is displayed and an explanation text display area 33 in which explanation thereof is presented. These display areas are provided on one screen.

Furthermore, a narration mode display portion 34, a navigation display portion 35 and a language mode display portion 36 are provided in some portions, and in addition a plurality of history icon display portions 37 in which history icons are displayed are provided. The table plate composed of a glass plate is made of a smoky glass, which is transparent but looks black when viewed from the front side to prevent the viewer to see the interior through it and is processed in such a way that images on the screen can be seen from the front side only when the images are projected by the projector 4. Thus, the structure in the interior cannot be seen, and the presence of the devices is not noticed.

The narration mode display portion 34 indicates whether or not the narration mode is active. When the narration mode is ON, a speaker icon is displayed in the narration mode display portion 34. When the narration mode is OFF, nothing is displayed therein. The narration mode is selected by mode switching means operated through the touch keyboard 26. When the narration mode is selected, voice data stored as a content is reproduced.

The navigation display portion 35 visually displays the amount of the content corresponding to the icon, and the position of the current display in the entire content is also indicated. In this case, the amount of the content is managed by the number of pages, and therefore the total number of pages is visually displayed, and the position of the current page in the entire page is indicated.

The language mode display portion 36 makes a display to the effect that a foreign language version of the content displayed and narration is available. More specifically, when an English version of the content is available, "E" is displayed, and when a Chinese version is available, "C" is displayed. If no foreign language version is available, no display is made.

Figure 7:
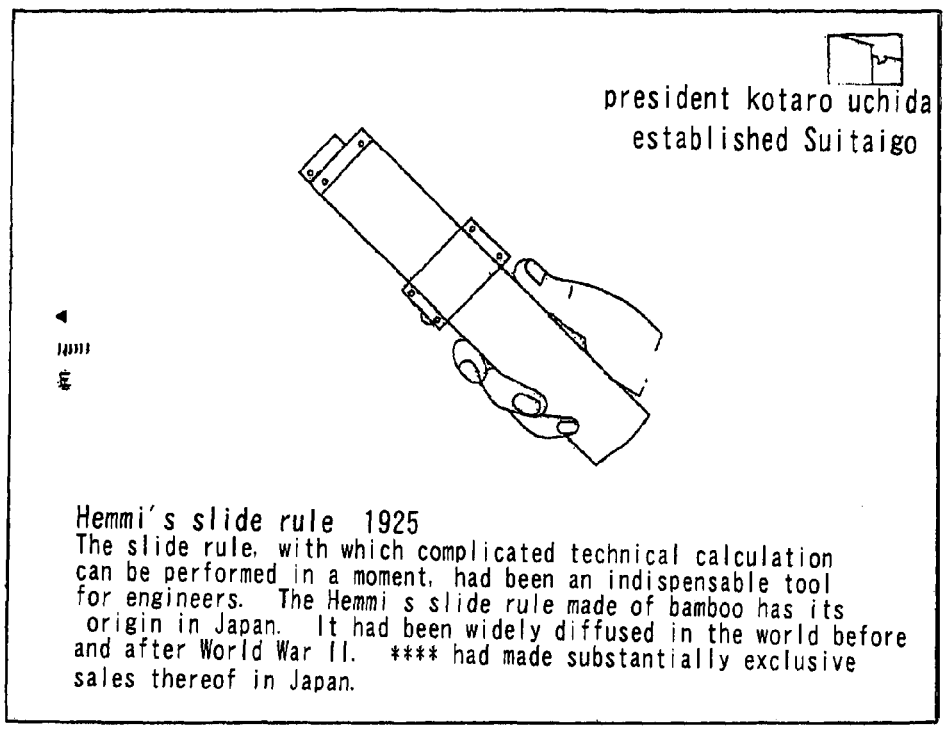
FIG. 7 shows an example of a screen display on a table.

In performing a presentation, when an English version of the corresponding content is available and display in English is needed, English mode is selected by the mode switching means operated through the touch keyboard (FIG. 7).

The presentation table 3 is designed in such a way as to harmonize with the surrounding environment so that it is not conspicuous. To this end, the table plate is constructed by attaching a projection screen to a black smoke glass. The smoke glass reduces influences of external light on the projection screen and makes the white screen look darker.

Accordingly, guests will stand in front of the graphic panel 1 without paying a significant attention to the presence of the table. This helps to enhance effects in causing a surprise or sensation when a content is displayed on the tabletop later.

Figure 8:
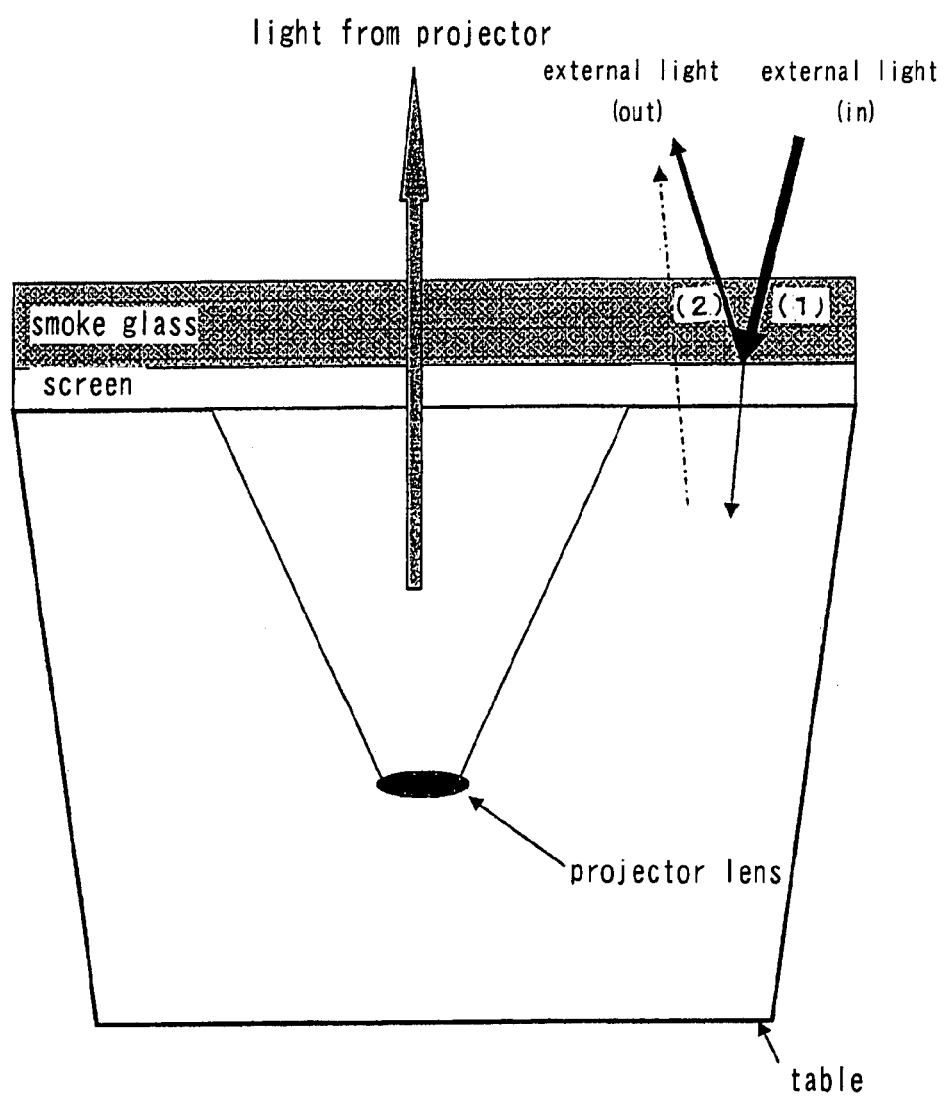
FIG. 8 is a diagram showing the structure of the table plate.

As shown in FIG. 8, thanks to the structure in which a nearly white, semi-transparent screen is attached on the bottom surface of the table plate made of a smoke glass, the external light entering the smoke glass is reflected at the interface with the screen, passes through the smoke glass again and exits to the exterior. Thus, the external light passes through the smoke glass twice. On the other hand, the light from the projector that is cast from below the screen is projected onto the screen, and then the light passes through the smoke glass only once. Accordingly, the contrast of the image is enhanced relatively.

Furthermore, by providing a light blocking mask at a position before the screen at which light of the projector is not focused, light near the edges of the projected image is blocked, so that the circumference of the image on the screen is blurred, whereby unity of the table and the content is more enhanced.

The personal computer 5 housed in the presentation table 3 is connected to the projector 4, the touch key 26 and the RFID reader 23, and the RFID reader 23 is connected with the antennas 25 mentioned before via a distributor 27.

In the database provided in the personal computer 5, content data associated with identification information stored in the RFID is stored in one-to-one relationship.

An audio system is provided in the exhibition space. To enhance the effectiveness of the expression of the content, a non-directional speaker system is provided to construct a sound environment in which sound effects upon displaying the content or upon switching the image and sounds such as narration fall on ears from nowhere.

The presentation table 3 is equipped with a power supply function and a heat exhaust function. There is provided an RFID recognition system for recognizing the information of the "icon 2". This RFID recognition system has an ID identification function for identifying the RFID (i.e. IC tag) attached to the "icon 2" to display the content represented by each "icon 2" on the tabletop. This system has an anti-collision function, and it can identify a plurality of tags (up to 15 IDs) simultaneously. The function of identifying a plurality of tags without data collision is called an anti-collision function. Once tags are read, the identification information is held in the memory until all the tags are removed from the magnetic field of the antenna 25 and the initialized state is restored. The RFID recognition system is constructed by the following devices and software.

Figure 9:
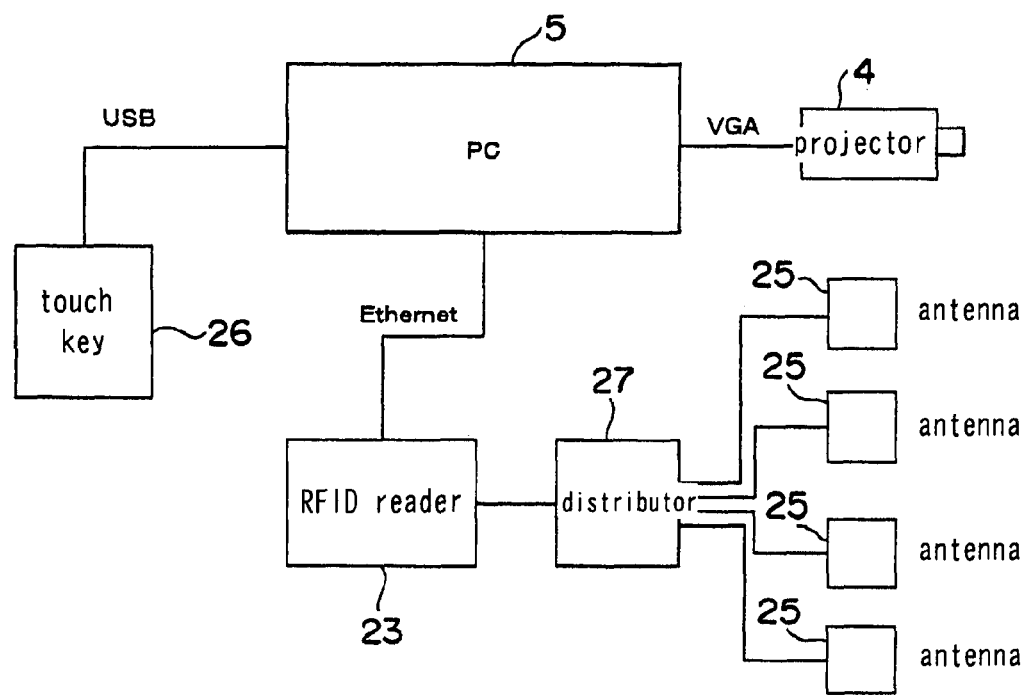
FIG. 9 is a block diagram showing the system configuration.

That is, as shown in FIG. 9, the system is constructed by an RFID reader 23, RFID antennas 25 (four sets) for supplying electric power to the RFID, a four channel distributor for connecting the four antennas 25 to one reader, a control PC (which also serves as the content display PC) that is connected with these components to control them and displays the content associated with an exhibit on the display screen, and RFID identification software loaded into the control PC for obtaining the ID stored in the RFID and transmitting its data to a content display system.

Here, a flow chart of the operation of the RFID identification software will be described.

Figure 10:
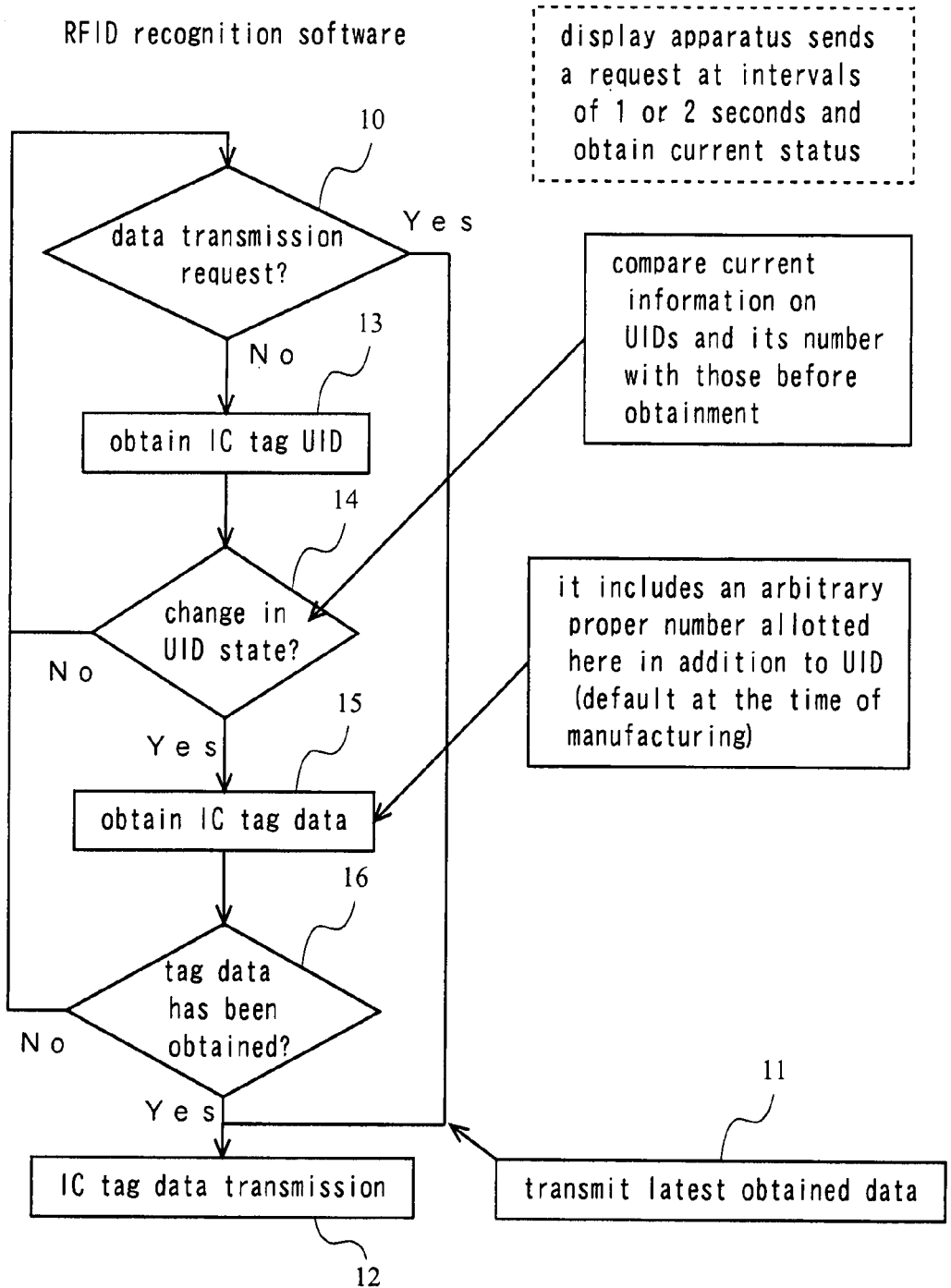
FIG. 10 is a flow chart of the operation process of RFID recognition software.

As shown in FIG. 10, a processor of a content display control apparatus sends a request to the RFID reader 23 at predetermined intervals (intervals of one or two seconds) (step 10). When a request is made, the latest data that has been already obtained is obtained (step 11), and that data is transmitted to the content display control apparatus (step 12).

When a request is not made in step 10, the unchangeable UID (unique identification) uniquely stored in the IC tag before it is shipped by the manufacturer is obtained by the RFID reader 23 (step 13). When there is an icon 2 on the table at this stage, the UID of the IC tag of that icon 2 is obtained, but when there is no icon 2, the result is UID=none. The IC tag UID obtainment state is compared with the number of the UIDs that have been stored in an auxiliary storage device before the obtainment (step 14). When there is a change therein, an IC tag data (ID) is obtained (step 15).

Then, a determination is made as to whether the IC tag data (ID) has been obtained or not (step 16). In cases where the IC tag data has been obtained, that data (ID) is transmitted to the content display control apparatus (step 12). On the other hand, in cases the IC tag data (ID) has not been obtained in step 15 due to a reading error or other reasons, the process returns to step 10. In addition, the process also returns to step 10 in cases where there is no difference, in step 14, between the IC tag UID obtainment state and the state that has been stored in the auxiliary storage device before the obtainment.

Next, a description will be made of the content display system.

According to the ID identified by the RFID recognition system, a function of displaying the content (such as a FLASH file, a still image, a movie file, a web site and a PPT file) designated by that ID on the tabletop is executed. Here, FLASH is a registered trademark of Macromedia Incorporated.

In cases where a plurality of tags are successively recognized, the content associated with the identification ID that was recognized last is always displayed according to the "last-out rule". The content that has been displayed previously is turned into a thumbnail image (reduced-size image) 37 and displayed as history information at a position near the edge of the tabletop. By removing all the tags out of the magnetic field of the antennas 25, the initial state is restored.

The content displayed according to the identification ID of the RFID may be composed of multiple pages, and the system is adapted to allow to turn the page forward or backward using a touch sensor key 26 (arrow key) provided on the tabletop for operating the content. The touch sensor key 26 is also used to turn on/off the narration sound, switch the language (Japanese, English, Chinese etc.) and operate a movie file (e.g. to cause it to pause).

The content display system is constructed by the following devices and software.

That is, the system is constructed by a PC 5 for storing and displaying contents (which also serves as a control PC), content display software, contents (such as flash files, still images, movie files and PPT files), a touch key sensor 26 for allowing operation of a content (used, for example, to turn the page, switch the sound and switch the language), a projector 4 (DLP, high-contrast, short-focal-length type) and members constituting the optical path (such as a reflection mirror, a rear screen type tabletop, and a filter).

Figure 11:
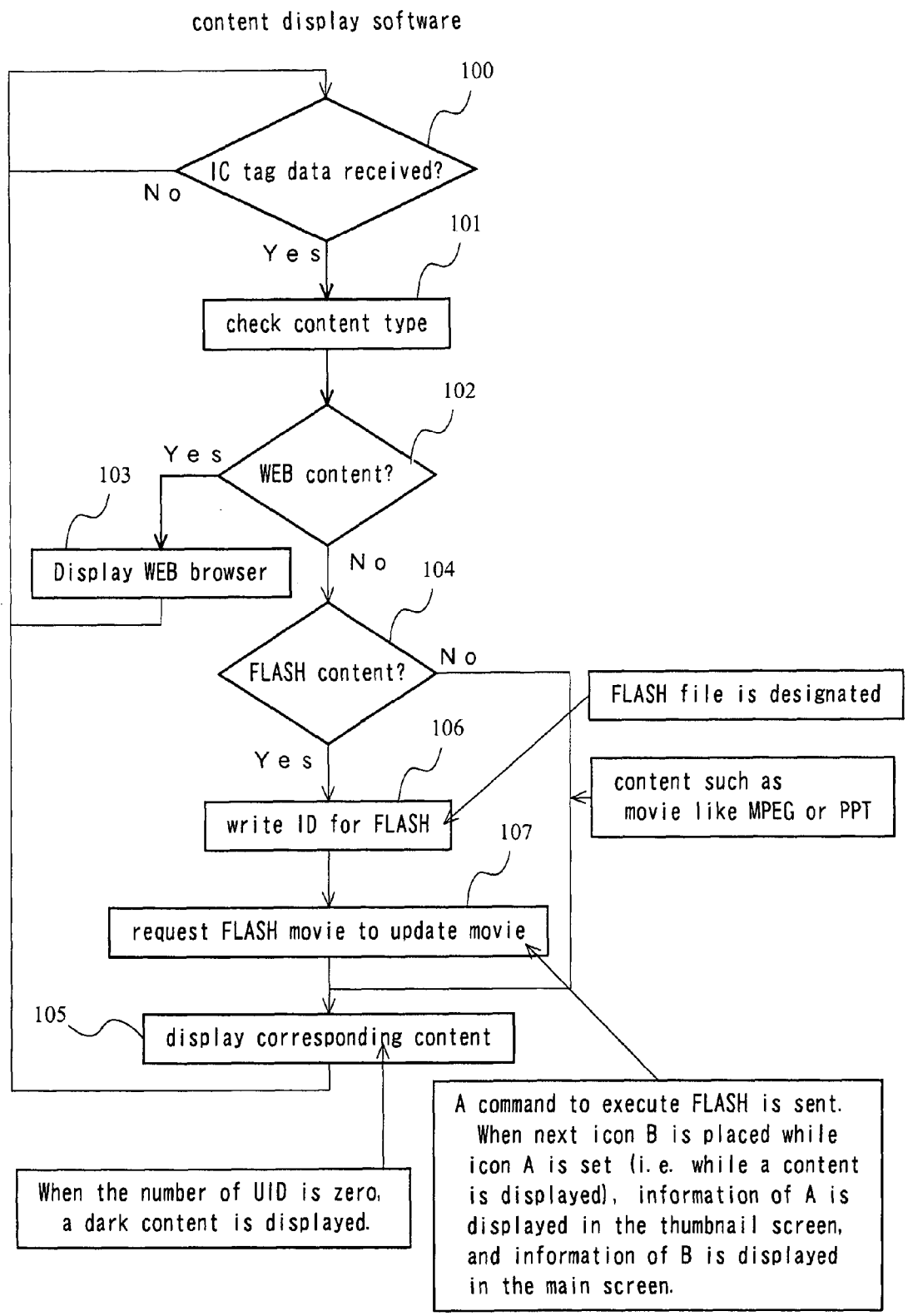
FIG. 11 is a flow chart of the operation process of content display software.

The flow chart of the content display process will be described with reference to FIG. 11.

First, a determination is made as to whether or not the content display control apparatus has received IC tag data (ID) or not (step 100). When not received, this determination is made repeatedly. In other words, the process is in a receiving waiting state. When IC tag data (ID) has been received by the content display control apparatus, the content type is checked.

Specifically, the content information registered in association with the ID is taken out from the database (step 101). The content information is a WEB content, a FLASH file, a still image or a PPT file etc. that is associated with the exhibit specified by the ID.

A determination is made as to whether or not the content specified is WEB content in accordance with content information (step 102). When the content is a WEB content, a web browser is activated, and the web page having the specified URL is displayed (step 103).

When the content specified is not a WEB content, then a determination is made as to whether it is a FLASH content or not (step 104). When the content is not a FLASH content, it is a still image, a movie file or a PPT file etc. other than a FLASH file. Then the associated content is taken out from the database and displayed (step 105).

In step 104, when the specified content is a FLASH content, an ID for FLASH is written (step 106) to designate the FLASH file to be read out.

Then, update of the FLASH movie is requested (step 107), and the FLASH movie is reproduced as the associated content (step 105). When a plurality of icons 2 are placed on the table successively, a plurality of tags are to be recognized sequentially. In this case, the process follows the "last-out" rule. For example, if information from a plurality of icons 2 were provided in step 107, a malfunction would occur. In view of this, when icon B is placed while icon A is on the table, the information associated with icon A is displayed in the thumbnail screen, and the information associated with icon B is displayed in the main screen.

As per the above, by a cooperation of hardware and software, identification information detection means for detecting identification information for identifying the presentation subject stored in the memory of an icon wirelessly in a non-contact manner, content obtaining means for obtaining the content associated with the identification information detected by this identification information detection means from a database or a server on the Web, and means for displaying the content obtained by the content obtaining means on a display apparatus can be conceived.

In the following, the procedure of an operation of this system (in a case in which a history of a corporation is presented to a guest) will be described. As a preparatory setting, ID information (identification information) associated with an exhibit is determined in advance, and that ID information is written in the IC of an RFID using an RFID writer. Content information including multiple pages associated with that exhibit is stored in the database in relation to the ID.

(1) Leading into the Exhibition Space

A guest is first led into the exhibition space. The exhibition space has illumination effects and spatial design with which the guest will notice the display panel 1 first, and the table that displays the content is so designed as to harmonize with the surrounding environment so that it is not conspicuous. Thus, the guest will stand in front of the display panel 1 without paying a significant attention to the presence of the table 3.

(2) Explaining Overall Perspective of Information

First, a host operator explains the overall perspective of information (that is, in this case, the overall history of the corporation) using the display panel 1. Thanks to browsability of the display, it is possible for the viewer to grasp the overall perspective of the history of the corporation and its of display processing with some delay (like a scene reflected on water in a round tray).

The content includes a plurality of pages like a book, and when the icon is placed on the table, the second page in which its summary is presented is displayed as a default page.

(5) Presentation of the Topic

The operator performs the detailed presentation of the topic by operating the function of turning pages of the displayed content using the arrow key (touch keyboard 26) on the tabletop. For example, in the case where a product appearing in the history of the corporation is to be explained, the default page that appears when the "icon 2" is placed on the tabletop describes the outline of that product, and when pages are turned, background information such as why the product was developed (in the first page) and chronological information such as how the product had evolved thereafter (in the third and subsequent pages) may be presented. When pages are turned, animation effects (such as a dissolve (which is a technique of replacing the image slowly by using fade-in and fade-out simultaneously) or a zooming-in/out) in replacing the image and sound effects generated from a non-directional speaker are used to add a rendition that makes one to image information floating in the whole relation with social history, cultural history and history of related industries (FIG. 2).

(3) Selecting a Topic to be Explained in Detail

The presenter selects a topic to be explained in detail (that is, in this case, an epoch-making product/technology or an episode) in accordance with interests of the guest or the atmosphere at that time, and takes the "icon 2" for activating the content explaining that topic out of the storage recess 10 on the panel 1. In the "icon 2" is encapsulated a miniature model or picture 11 that reminding the viewer of that topic. The presenter shows it to the guest as an introduction to a detailed explanation.

(4) Placing the Icon on the Tabletop to Display the Content

Placing the "icon 2" taken out from the display panel 1 on the circumferential portion of the tabletop (i.e. above the RFID antennas 25 concealed behind the top plate of the table) activates display of the contents of the topic designated by the "icon 2" with sound effects. The content such as a clipped image has been undergone image processing that makes it harmonize with the background color of the tabletop, and it appears in a manner that does not remind the viewer of the presence of the screen of the PC thanks to effects space.

(6) Displaying Different, Related Topics

In explaining a certain topic, presenting a different topic related thereto helps understanding of relationship between individual parts of information and clearer comprehension of the overall perspective. To this end, while the content of that topic is still displayed on the table top, another "icon 2" that activates a related topic is taken away from the panel 1 and placed on the circumferential portion of the tabletop (above the RFID antennas 25). Then, the content associated with the topic designated by the newly-placed "icon 2" is displayed according to the "last-out rule". This content can also be presented in detail with the use of arrow key in a similar manner as with the previous topic. By repeating this operation, it is possible to present up to fifteen topics successively. The content displayed previously is displayed as an thumbnail image 37 at a position near the edge of the tabletop, and when a new topic is to be displayed, an "icon 2" is taken away from the display panel 1. Thus, information can be handled in such a way the place of a part in the whole can be understood.

(7) Narration, Movie Reproduction, WEB and PPT File etc.

What has been described in the foregoing is the procedure of the operation under the assumption that the presentation is performed in the form in which the presenter himself/herself gives an explanation while using a slide show based on FLASH files. Besides this, contents can be used in the following manners.

Narration mode (with a multi-language switching function such as Japanese, English and Chinese)
Movie reproduction (MPEG1/MPEG2 movie file)
PPT (powerpoint: registered trademark) slide show
WEB page By using the above contents in combination in addition to FLASH files, it is possible to perform a presentation according to circumstances depending on interests or needs of the guest.

(8) Termination of Presentation

By removing all the icons 2 out of the magnetic field of the antennas 25, the content display system returns to its initial state. Accordingly, by pushing the "icons 2" placed on the circumferential portion once into the central portion of the table, the screen turns dark. Thus, the presentation can be terminated.

Figure 12:
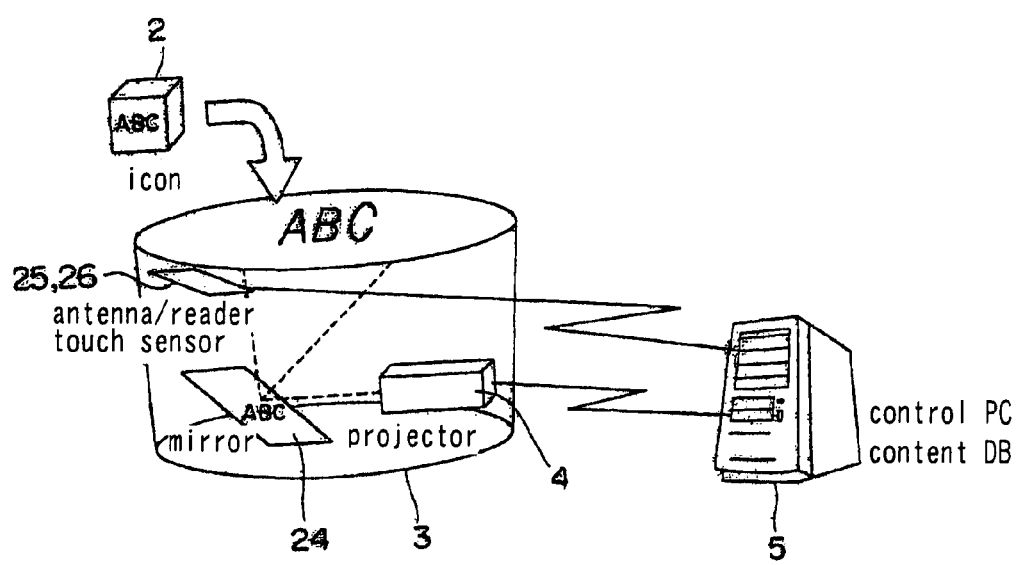
FIG. 12 schematically illustrates another system configuration.

Although in the foregoing, a case in which the present invention is applied to a corporate museum has been described, various presentation can be performed by using only icons 2 and a presentation table 3 (including a control PC) as shown in FIG. 12. Furthermore, an effective rendition is made possible by performing a presentation using designation members (icons) in the form of cards like playing cards in such a way as to placing the cards according to a presentation sequence.

Figure 13:
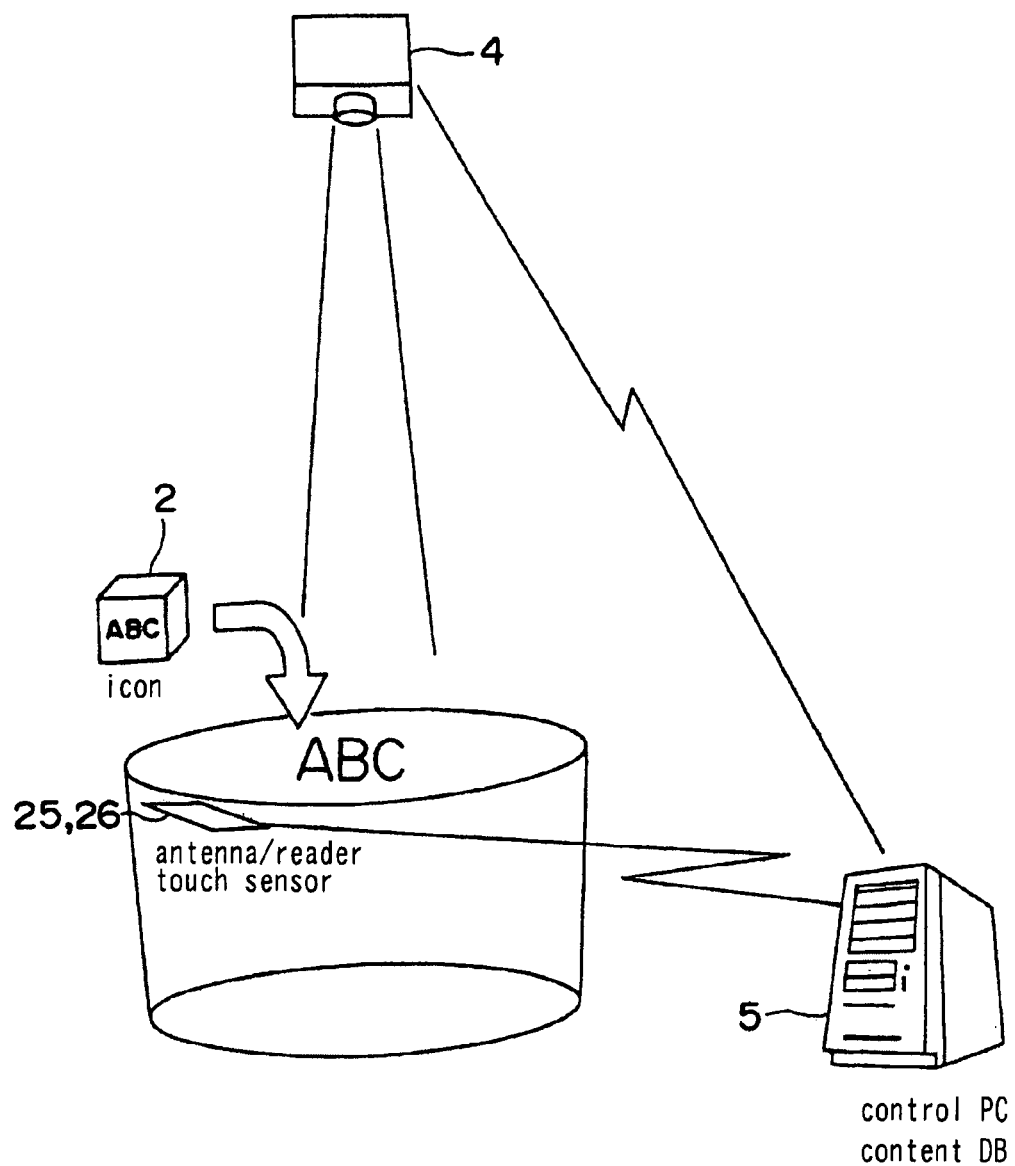
FIG. 13 schematically illustrates still another system configuration.

In FIG. 13 is illustrated a case in which a screen is formed on the non-transparent top plate of a table and a projector serving as an projection apparatus for projecting images onto the screen is provided in the ceiling cavity.

Although a case in which the present invention is applied to a corporate museum has been described in the foregoing, the present invention can be utilized in a presentation of exhibits that are arranged in a chronological order in, for example, various histories or biological evolution, an explanation of collections such as art objects, antiquities or toys that are exhibited in accordance with a certain classifications, and an explanation of various articles for sale.

The smoke glass used in the present invention may be, for example, Suneurogrey (trademark) manufactured by Asahi Glass Co. Ltd. This is a glass tinted gray by addition of a metal in a glass material. A film is attached to it when used. The film used may be Milkymilky (trademark), which is a mat film manufactured by Sumitomo 3M Limited.

Second Embodiment

Next, a second embodiment will be described with reference to FIG. 14.

Figure 14:
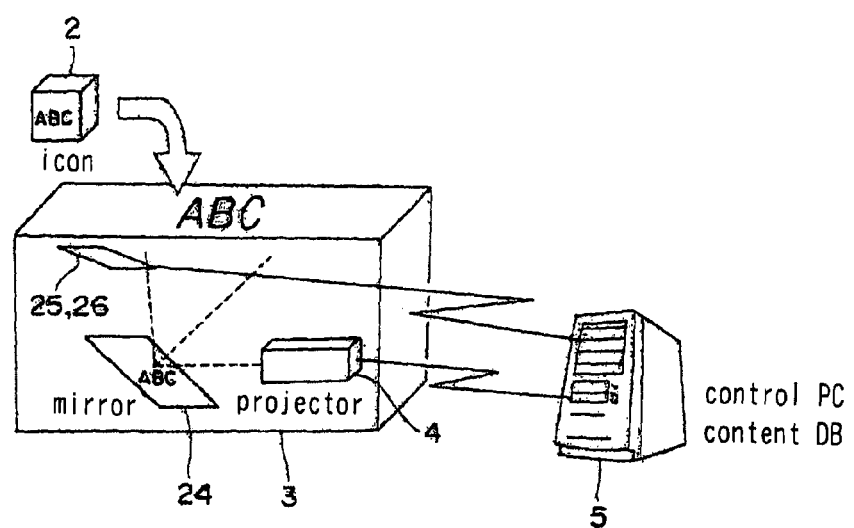
FIG. 14 schematically illustrates still another system configuration implemented as a counter table.

As shown in FIG. 14, said presentation table is constructed as a counter table for face-to-face sales. For example, in the case where this presentation table is used in a jewelry store, a projector, a mirror, antennas, a reader, a touch sensor, a top smoke glass and a screen on the backside surface of the smoke glass in a table like those shown in FIG. 1 are provided in the counter.

In a cubical icon 2 (designation member) made of a transparent acrylic resin is encapsulated a representational model of a jewel as an article to be sold. An RFID tag in which information for specifying the jewel to be sold is provided on the bottom surface of that icon in advance.

In a jewelry store, there are jewels of various forms though they are of the same kind, and it is expensive to make an icon 2 for each of the jewels. So, it is desirable that only an RFID tag for each be made in advance, and it be detachably attached to the backside of the icon 2 each time.

Information on a jewels as an article to be sold, an enlarged image of that article (for checking the presence/absence of flaws) and information for explanation of the jewel supplied from a control content DB are displayed, and a customer considering to buy the article see them to decide whether to buy the article.

In cases where merchandise is suitable for the above sales style, it is possible to apply the present invention to this face-to-face sales using a counter. Another merchandise is, for example, liquors sold at a bar counter. In this case, a miniature bottle of a liquor is encapsulated in a cubical icon 2. When the icon 2 is placed on the bar counter, it is detected by antennas, and information on that liquor (such as the name, type, making process, producing district and way of drinking of the liquor, and in the case of a cocktail, the preparation procedure) is displayed on a display.

Third Embodiment

In the following case, a plurality of said presentation tables is prepared in a museum or a gallery having multiple exhibition rooms, and the presentation tables are placed in different exhibition rooms respectively, and exhibits in each exhibition room are explained using the presentation table.

Figure 15:
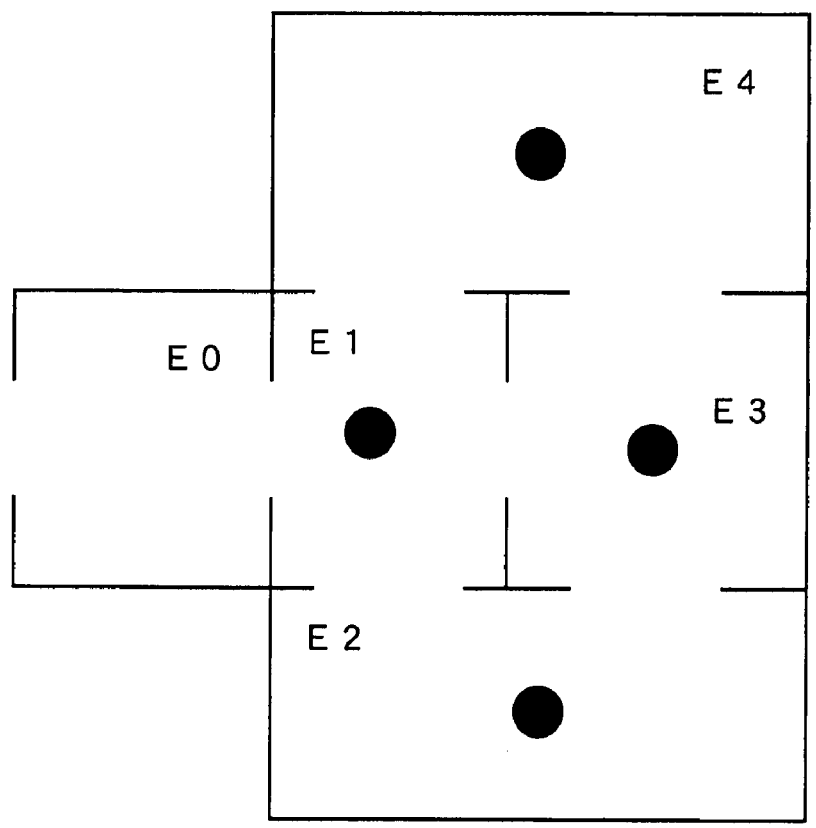
FIG. 15 is a schematic layout plan of exhibition rooms in a museum.

FIG. 15 a layout plan of exhibition rooms of a certain museum. A presentation table is placed in each exhibition room, and the exhibits differ from exhibition room to exhibition room. Information contents concerning the respective exhibits are stored in a content server in advance.

A visitor of this museum chooses or picks up one designation member (icon) at the entrance. Upon entering, the visitor is given a visitor card (or user card) allotted with an ID number in advance. The visitor establishes an association between the identification data of the designation member (icon) that he/she picked up and the ID number of his/her visitor card using a computer terminal provided near the entrance. Specifically, a tag reader serving as non-contact IC tag data reading means is provided in the aforementioned computer terminal, and when the identification data of the designation member (icon) is read by the tag reader, an entry screen corresponding to it appears. Then, the visitor enters the ID number of the visitor card with this entry screen. The computer terminal is linked with the content server, and the state of usage of the presentation table (i.e. usage history information) by the visitor is managed thereafter with reference to the ID number of that visitor card. Specifically, which presentation tables the visitor has visited is recorded under a management item according to such a control ID number. Such information is recorded by a usage history registry portion.

Not only which table he/she has visited but also which content was displayed when the visitor moved between tables and which content he/she has seen etc. are recorded as usage history information with time information.

In this way, it is possible to analyze which exhibit interested the visitor and what degree of interest he/she had. Specifically, if the time since the visitor started to see a certain content at a certain table until he/she started to see a content at a next table to which he/she had come after leaving the previous table was long, it may be assumed that the visitor was interested in the content at the previous table. On the other hand, if that time was short, what does it means? When the time is shorter than the content reproduction time, it is assumed that the visitor got tired with the content during reproduction of the content.

To infer such things, information specifying the presentation tables the visitor has visited in the past, information specifying the contents he/she has seen in the past, the date and time he/she visited a presentation table and the date and time he/she saw a content are recorded in the usage history registry portion with information specifying the visitor.

The usage history registry portion is provided, for example, in the content server. Alternatively, it may be provided in some computer provided in the network. The user chooses or picks up a designation member for example at the entrance of the museum, and uses it thereafter upon utilizing the museum.

In the next presentation table at which the visitor uses the designation member, the content display control apparatus may read out past usage history information from the aforementioned usage history registry portion and change the content to be displayed on the display depending on the past usage history.

For example, in FIG. 15, there are four exhibition rooms that follow the entrance room (E0), and different exhibits are displayed in the respective exhibition rooms. In such a museum, when the visiting order of the visitor changes, the content displayed on the presentation table is varied depending on the visiting order. Here, it is assumed that a first presentation table is placed in the first exhibition room (E1), and a model of a dinosaur is displayed in the surrounding thereof as an exhibit. It is assumed that the second room (E2), the third room (E3) and the fourth room (E4) are adjacent to the first room (E1) through its three walls other than the wall adjacent to the entrance, and the second to fourth rooms are connected by passages. In the second to the fourth rooms are placed second to fourth presentation tables respectively to display contents associated with the exhibits in the respective exhibition rooms.

In doing so, it is preferred that the aforementioned content server give certain continuity to the contents that change depending on the usage history of the designation member so as to give a storyline to the entire display contents obtained in sequentially visiting a plurality of presentation tables.

For example in the above case, it is assumed that excavated articles of the Egyptian civilization are displayed in the first exhibition room, excavated articles of the Mesopotamian civilization are displayed in the second room, excavated articles of the Indus civilization are displayed in the third room, and excavated articles of the Huang civilization are displayed in the fourth room. According to the above mentioned layout of the exhibition rooms, it is necessarily determined that the visitor enters from the entrance into the first exhibition room (the Egyptian civilization), but there are various visiting routes that may be followed thereafter as exemplified in the following routes (1) to (4).

(1) The route from the first exhibition room (the Egyptian civilization) to the second exhibition room (the Mesopotamian civilization), thereafter to the third exhibition room (the Indus civilization), and thereafter to the fourth exhibition room (the Huang civilization), (2) The route from the first exhibition room (the Egyptian civilization) to the fourth exhibition room (the Huang civilization), thereafter to the third exhibition room (the Indus civilization), and thereafter to the second exhibition room (the Mesopotamian civilization), (3) The route from the first exhibition room (the Egyptian civilization) to the third exhibition room (the Indus civilization), thereafter to the first exhibition room (the Egyptian civilization), and thereafter to the second exhibition room (the Mesopotamian civilization), (4) The route from the first exhibition room (the Egyptian civilization) to the second exhibition room (the Mesopotamian civilization), thereafter to the first exhibition room (the Egyptian civilization), thereafter to the third exhibition room (the Indus civilization), thereafter to the first exhibition room (the Egyptian civilization), thereafter to the fourth exhibition room (the Huang civilization), and thereafter to the first exhibition room (the Egyptian civilization).

In the case where the visitor visits the presentation tables in the respective exhibition rooms according to the above described pattern (3), the content displayed first at the presentation table in the fourth exhibition room is a topic on the Indus civilization that is relevant to the Egyptian civilization that has been viewed in the preceding exhibition room. For example in the case where the focus is on "bricks" as construction materials, in the Egyptian civilization, since the most of its area is a desert where it seldom rains, sun-dried bricks made by merely drying a lump of earth used to be used as construction materials. On the other hand, in the Indus civilization, baked bricks on which Buddhist motifs are carved in relief used to be widely used. The two civilizations can be linked by the keyword "brick", though they do not have relation in terms of methods of making construction materials, and it is possible to interest the viewer continuously.

To ensure a storyline, the content that is most relevant to a previously viewed content may be searched for using a search engine (with the possible use of various engines such as natural language search engines) and displayed for view on the succeeding presentation table, or a linking content for bridging the content to be viewed at the succeeding presentation table and the content viewed in the preceding presentation table may be inserted.

Other Embodiments

In the above described embodiment, the user of a designation member is specified by the ID number of a visitor card. In connection with this, user information registry means for storing user information may be provided, and the user information registry means may be provided with point awarding means for depositing a point for each user every time the user visits the aforementioned presentation tables. In this connection, the address, phone number and e-mail address etc. may be recorded as user information, and the deposited points may be made viewable through the Internet, or may be reported by a mail to promote revisitation to the museum.

At the occasion of the next visitation, reference is made to the usage history based on the registered personal information, and viewing using a route different from the previous route is proposed thereby not tiring the visitor.

In addition, there may be provided an exhibition changing apparatus that performs a control to change one of exhibition equipments or exhibits disposed in the surrounding of a presentation table upon detection of the aforementioned designation member as a trigger. For example, a display panel or a shelf may be moved, or a model of a dinosaur displayed as an actual exhibit may be moved. Thus, an exhibition equipment disposed in the surrounding moves with an operation of the designation member, and the viewer will not be able to hide his/her surprise.

The invention claimed is:

1. A presentation system comprising:
a designation member having a non-contact IC tag that holds identification information of a presentation subject and a display representing the presentation subject;
a database in which information about the presentation subject associated with the identification information held in the designation member is stored in advance;
a presentation table having a table plate on which said designation member can be placed and non-contact IC tag data reading means that reads, when the designation member is placed on the table plate, the identification information of the presentation subject from the non-contact IC tag of the designation member in a state of not contacting with the non-contact IC tag;

a content display control apparatus that reads out information about the presentation subject associated with the identification information read by the non-contact IC tag data reading means from the database and displays it on a display apparatus; and a content server disposed in a network, wherein the content display control apparatus reads out information about the presentation subject associated with the identification information read by the non-contact tag data reading means from the content server and displays said information on a display apparatus, wherein the identification information for the designation member makes it possible to distinguish the designation member from another designation member, and wherein the presentation system further includes a usage history registry portion that records usage history information regarding usage of said designation member at a presentation table, and when a user uses said designation member, the content display control apparatus reads out usage history information regarding previous usage of said designation member at another presentation table from said usage history information registry portion and changes a content to be displayed on the display according to said usage history information.

2. A presentation system according to claim 1, further comprising:

a panel that displays a plurality of presentation subjects and has a portion for exhibiting said designation member provided in the vicinity of the display apparatus.

3. A presentation system according to claim 2, characterized in that the presentation subject displayed in said designation member is displayed in said display panel, and presentation by display on the display using the designation member is interrelated with display on the display panel.

4. A presentation system according to claim 2 further comprising an exhibition changing apparatus that performs a control to change at least one of an exhibition equipment and an exhibit disposed in the surrounding of the presentation table upon detection of said designation member as a trigger.

5. A presentation system according to claim 1, wherein at least a part of said table plate is made of a translucent material, and said display apparatus comprises a display screen disposed on a backside surface of the table plate.

6. A presentation system according to claim 5, characterized in that said table plate is made of a smoke glass and its backside surface comprises a translucent screen attached thereto, and an image is projected onto the screen from a projector.

7. A presentation system according to claim 1, characterized in that a screen is formed on said table plate and a projection apparatus for projecting an image on the screen disposed above the table.

8. A presentation system according to claim 1 characterized by a sound reproducing apparatus, wherein sound information about the presentation subject associated with the identification information held by the designation member is stored in said database in advance, and said sound reproducing apparatus reads out the sound information about the presentation subject associated with the identification information read by the non-contact tag data reading means from the database and reproduces it by a speaker.

9. A presentation system according to claim 1 characterized in that said presentation table is a counter table for face-to-face sales of an article for sale, and said designation member has a display representing the article for sale as the presentation subject.

10. A presentation system according to claim 1, characterized in that a plurality of said presentation tables are prepared, the presentation tables being placed in different places, a plurality of said designation members are prepared, contents associated with the respective designation members are stored in the content server, and a user picks up one of the designation members and visits presentation tables placed in a plurality of places.

11. A presentation system according to claim 1, characterized in that said content server gives certain continuity to contents that change according to the usage history of the designation member in order to give a storyline to the whole displayed content that are offered through visitations at a plurality of presentation tables.

12. A presentation system according to claim 1, characterized in that as user information, at least one of information specifying a presentation table visited in the past, information specifying a content viewed in the past, the date and time of visitation at the presentation table and the date and time of viewing of the content is recorded together with information specifying the user.

13. A presentation system according to claim 1 further comprising an exhibition changing apparatus that performs a control to change at least one of an exhibition equipment and an exhibit disposed in the surrounding of the presentation table upon detection of said designation member as a trigger.

14. A presentation system according to claim 1, wherein said designation member is in the form of a cubic object made of a translucent resin in which a display article representing the presentation subject is encapsulated, the non-contact IC tag being attached to a bottom surface of said cubic object.

15. A presentation system according to claim 1, wherein said presentation table further comprises an antenna for reading the identification information of the presentation subject provided along an outer peripheral portion of the table plate, and wherein the non-contact IC tag data reading means reads the identification information when the designation member is placed on the outer peripheral portion of the table plate.

16. A presentation system comprising:

a designation member having a non-contact IC tag that holds identification information of a presentation subject and a display representing the presentation subject;

a database in which information about the presentation subject associated with the identification information held in the designation member is stored in advance;

a presentation table having a table plate on which said designation member can be placed, and non-contact IC tag data reading means that reads, when the designation member is placed on the table plate, the identification information of the presentation subject from the non-contact IC tag of the designation member in a state of not contacting with the non-contact IC tag;

a content display control apparatus that reads out information about the presentation subject associated with the identification information read by the non-contact IC tag data reading means from the database and displays it on a display apparatus;

a content server disposed in a network, wherein the content display control apparatus reads out information about the presentation subject associated with the identification information read by the non-contact IC tag data reading means from the content server and displays said information on a display apparatus; and user information registry means for storing user information, wherein the user information registry means is provided with point-awarding means that deposits a point for each user every time the user visits the presentation table or another presentation table in the presentation system.

17. A presentation system according to claim 16 further comprising an exhibition changing apparatus that performs a control to change at least one of an exhibition equipment and an exhibit disposed in the surrounding of the presentation table upon detection of said designation member as a trigger.

* * * * *